Patented May 6, 1952

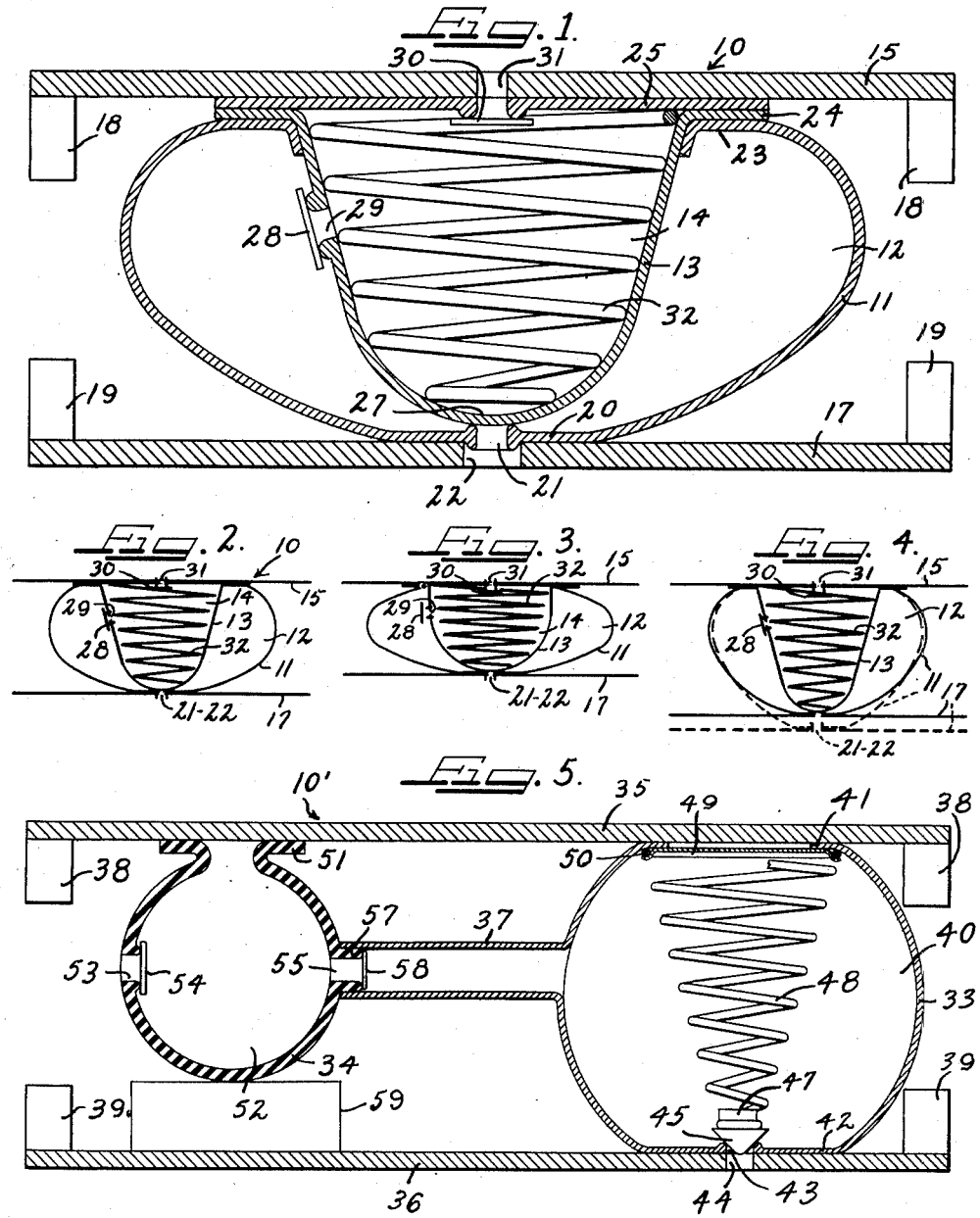

2,596,031

UNITED STATES PATENT OFFICE 2,596,031

PNEUMATIC SPRING

Harold R. Kaufman, Evanston, Ill.

Application November 25, 1947, Serial No. 788,041

12 Claims. (Cl. 267—65)

This invention relates to improvements in pneumatic springs and more especially pneumatic springs having shock absorbing qualities.

An important object of the present invention is to provide a pneumatic spring construction which is self-equalizing under variable loads.

Another object of the invention is to provide a pneumatic spring having effective shock-absorbing characteristics both on compression and rebound.

A further object of the invention is to provide a pneumatic spring construction in which a primary compression chamber and a supplementary compression chamber are so related that the primary chamber is charged or supercharged with air from the supplementary chamber as an incident to certain compression loads.

Still another object of the invention is to provide in a novel pneumatic spring construction improved means whereby pneumatic pressure is released upon reduction of the load or rebound beyond a particular limit.

Other objects, features and advantages of the present invention will be readily apparent from the following detailed description of certain preferred embodiments thereof taken in conjunction with the accompanying drawings, in which:

Figure 1 is a vertical sectional view through a pneumatic spring construction embodying features of the present invention and shown more or less schematically;

Figures 2, 3 and 4 are small scale schematic illustrations of the pneumatic spring of Figure 1 showing the same in various respective conditions during operation; and Figure 5 is a vertical sectional view through a modified form of pneumatic spring according to the invention.

A pneumatic spring 10 (Fig. 1) comprises a flexible walled casing member 11 defining a large capacity primary compression chamber 12, a smaller size flexible walled casing member 13 defining a smaller capacity supplementary compression chamber 14, and upper and lower supporting compression plates 15 and 17, respectively, which are secured to sprung and unsprung portions of whatsoever apparatus, machine, vehicle or the like with which the spring is employed. The supporting plates 15 and 17 may be round or square or any other preferred configuration and are preferably provided with opposing respective bumpers 18 and 19 for limiting approach of the plates in the most extreme compressed condition of the spring unit. The bumpers 18 and 19 may be made from any preferred material, such as a resilient material, as rubber or the like.

The primary compression chamber-defining member 11 is preferably formed from a flexible, non-elastic material such as thin metal, or a fabric or otherwise reinforced rubberized, or plastic impregnated, air impervious material of a bursting strength adequate to afford requisite safety factor. Although it may be of various desirable forms such as bellows and the like, it is preferably in the form of a somewhat flattened bulb having a base portion 20 secured in any suitable manner to the lower supporting plate 17 and formed with a preferably axial port 21 providing a relief valve opening registering with an exhaust port 22 in the supporting plate. At the top, the primary compression chamber bulb 11 is formed with a flange structure 23 defining an opening through which the supplementary air chamber member 13 projects and which is secured in air-tight relation with a marginal flange 24 of the supplementary air chamber member to a mounting panel or plate member 25, the latter in turn being secured to the lower surface of the upper supporting plate 15.

By preference, the supplementary air pressure compartment member 13 is also formed from a flexible but substantially non-elastic material similarly as the primary chamber bulb 11, but is of substantially smaller diameter and capacity and of relatively cup-like bulb shape.

The length of the supplementary chamber bulb 13 is such that the rounded extremity thereof, identified at 27, will normally engage over and act as a closure or check valve for the valve port 21. Thereby, air within the primary compression chamber 12 within the bulb 11 is trapped against leaving the chamber 12, by the inner bulb extremity check valve portion 27. As a result, increases in load tending to drive the upper supporting plate 15 toward the lower supporting plate 17, or movements in the unsprung portion of the associated apparatus causing upward movement of the lower plate 17 relative to the upper plate 15, will cause the air in the primary chamber 12 to be compressed and thus afford gradually increasing resistance to the approach of the supporting plates 15 and 17.

As shown in Figures 1 and 2, the spring unit 10 is in normal load condition. As the bulb 11 is compressed by reduction in the spacing between the upper and lower plates 15 and 17, the air within the chamber 12 is compressed and develops gradually increasing resistance to the approaching movement of the plates, increasing as the compression proceeds. At the same time, the inner bulb 13 is compressed, and being of smaller internal air capacity, the air within the chamber 14 is quickly compressed to a pressure exceeding that in the larger primary chamber 12, thus effectively supplementing the compression resistance of the compressed air in the chamber 12.

Building up of pressure within the supplementary compression chamber 14 is permitted only to a limited extent and then the greater pressure in the primary chamber 14 is released or equalized by opening of a normally closed check valve 28 controlling a port 29 in the side of the inner bulb 13. This allows the air of greater pressure within the chamber 14 to escape into and supplement the compressed air in the primary compression chamber 12. The normal bias of the valve 28 is to close the port 29 and thus prevent escape of air from the chamber 12 into the supplementary chamber 14. As shown in Figures 1 and 2, under normal load the valve 28 is closed. In Figure 3, which demonstrates a supercompressed condition of the spring, the valve 28 is shown open in course of equalizing pressure due to the pressure differential in the chambers.

Promptly upon rebound of the supporting plates 15 and 17, the release of pressure from the inner bulb 13 and thus reduction in pressure in the supplementary compression chamber 14 causes the valve 28 to close, especially under the greater pressure which will then prevail in the primary chamber 12. Since the extremity check valve portion 27 of the inner bulb 13 closes the escape port 21 in the primary chamber bulb 11, the supplemented air within the bulb 11 is prevented from escape from the chamber 12 and a resistance is developed to rebound so that rebound shock is absorbed.

After pressure within the supplementary chamber 14 falls below atmospheric in the rebound condition of the spring, as indicated in full outline in Figure 4, a normally closed valve 30 opens a recharging port 31 in the roof of the chamber 14, in the present instance extending through the mounting panel 25 and the top plate 15. As soon as the pressure within the chamber 14 becomes greater than atmospheric, the valve 30 closes and thus traps the air within the chamber 14.

Rebound beyond a certain limit, as indicated in dash outline in Figure 4, carries the base portion 20 of the outer bulb 11 beyond the check valve extremity 27 of the inner bulb 13 and thus opens the exhaust port 21. This relieves excess pressure within the primary chamber 12. As a result, when the spring returns to normal the air pressure within the primary chamber 12 and within the supplementary chamber 14 will be substantially equalized.

Furthermore, should the load on the spring become lighter there will be a tendency for the exhaust port 21 to be held open longer and thus permit greater amount of air to escape from the chamber 12 thereby lessening the pneumatic resistance within the spring and effecting a general equalization of the sprung distance between the supporting plates 15 and 17. This same condition or equalizing action takes place when due to temperature conditions the air in the chambers 12 and 14 expands. On the other hand when temperature conditions are on the cold side, the pressure within the chambers will be equalized by a reduction in tendency of the air to escape from the exhaust port 21 due to lesser time intervals in opening of the port by reason of the reduced expansion pressure of the air in the pressure chambers.

In order to maintain the inner bulb 13 in a normally distended condition to maintain the check valve extremity 27 thereof effective, a helical expansion spring 32 of proper load characteristics is preferably provided, having the larger end bearing against the mounting panel 25 and the smaller end bearing against the check valve extremity 27 within the chamber 14. The spring 32 may have certain supplementary springing qualities if desired. However, its primary function is to maintain the inner bulb 13 extended.

In the modified air spring 10' shown in Figure 5, a principal air spring casing member shown as in the form of a bulb 33 and a supplementary air spring casing member shown as a bulb 34 instead of being disposed one within the other, are separately mounted between upper and lower supporting compression plates 35 and 36, respectively, and are functionally connected through the medium of a duct 37. By preference, the supporting and compression plates are equipped with compression limiting bumper structures 38 and 39, respectively.

The principal air spring bulb 33 defines a primary air chamber 40 and is preferably formed from a substantially non-elastic but flexible material. At its upper end, the bulb 33 has a flange 41 defining an opening for pre-assembly access into the bulb and which flange is secured in appropriate air tight manner to the under face of the upper plate 35. At its lower end, the bulb 33 is formed with a base portion 42 which is secured in an air tight manner to the upper face of the lower plate 36 and has an axial exhaust port 43 registering with an exhaust port 44 in the plate 37.

In control of the exhaust port 43 is a valve member 45 which may be a conical structure having an annularly grooved stem 47 engaged by the diminutive end coil of a spiral compression spring 48. Thereby the valve 45 is held normally seated in closing relation to the port 43 to the predetermined limit of expansion of the spring 48 whereupon the spring pulls the valve 45 off its seat for discharge of air from the chamber 40. This action is similar to the action described hereinabove wherein the port 21 is opened by the over-expansion of air within the primary air chamber or by rebound of the sprung portion of the apparatus with which the spring is associated to the extent where the primary air spring bulb 11 is extended sufficiently to effect release of air therefrom to relieve the pressure within the primary spring chamber.

At its upper end the spring 48 is held by suitable means such as a hanger plate 49 which engages the maximal coil thereof and identified at 50. If preferred, the spring hanger 49 may also serve as a clamping medium for securing the upper flange 41 of the bulb 33 to the plate 35 there being, of course, a suitable securement of the plate 49 to the plate 35.

The auxiliary air bulb 34 may be formed from a suitable resiliently flexible material such as rubber or synthetic rubber and is formed with an upper outwardly extending attachment flange 51 by which it is secured in suitable manner to the under face of the upper plate 36. The outer diameter and the capacity of the auxiliary bulb 34 are, of course, proportioned adequately smaller than the dimensions and capacity of the primary air spring bulb 33 so that in the operation of the spring unit an auxiliary air chamber 52 within the bulb 34 will function to supply auxiliary springing, and air charging and supercharging for the chamber 40 within the bulb 33. Atmospheric air is admitted into the chamber 52 through a port 53 in the bulb 34 and controlled by a normally closed check valve 54. Air is delivered to the bulb 33 through a port 55 opening through a nipple boss 57 into the adjacent end of the delivery duct 37 and normally closed by a pressure check valve 58 responsive to pressure differential in the respective chambers 35 and 52. Thus, under compression when the pressure within the auxiliary chamber 52 becomes greater than the pressure within the primary chamber 40 air under pressure is forced past the valve 58 into the primary chamber 40.

From the foregoing it will be apparent that the present invention provides a self-contained, self-charging air spring unit in which the primary and supplementary air chambers are so cooperatively related that not only does the supplementary air chamber afford auxiliary compression or impact springing but also serves to charge or supercharge the primary air spring chamber which is of substantially larger capacity and therefore greater pneumatic springing range. Furthermore, the pressure relief valve feature of the primary air spring bulb and chamber assures efficient equalization for variable sprung loads and for self-adjusting springing action under constant loads and temperatures.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a pneumatic spring construction, means providing a compressible primary air spring chamber of large capacity for supporting a sprung load, means providing a supplementary air chamber cooperatively related to the primary air chamber means to become operative as a sprung load sustaining medium and arranged to be placed under compression incidental to compression of the primary air chamber, and means affording communication between the primary and supplementary air chambers for charging air from the supplementary air chamber to the primary air chamber when during joint compression of the air chambers the pressure under compression in the supplementary air chamber becomes greater than the pressure in the primary air chamber, said supplementary air chamber means comprising a flexible casing inside of the primary air chamber.

2. In combination in a pneumatic spring construction, means providing a compressible primary air spring chamber of large capacity for supporting a sprung load, means providing a supplementary air chamber cooperatively related to the primary air chamber means to become operative as a sprung load sustaining medium and arranged to be placed under compression incidental to compression of the primary air chamber, and means affording communication between the primary and supplementary air chambers for charging air from the supplementary air chamber to the primary air chamber when during joint compression of the air chambers the pressure under compression in the supplementary air chamber becomes greather than the pressure in the primary air chamber, said supplementary air chamber means including a casing externally of the primary air chamber and mounted as an operative unit with the primary air chamber means.

3. In combination in a pneumatic spring construction, means providing a compressible primary air spring chamber of large capacity for supporting a sprung load, means providing a supplementary air chamber cooperatively related to the primary air chamber means to become operative as a sprung load sustaining medium and arranged to be placed under compression incidental to compression of the primary air chamber, and means affording communication between the primary and supplementary air chambers for charging air from the supplementary air chamber to the primary air chamber when during joint compression of the air chambers the pressure under compression in the supplementary air chamber becomes greater than the pressure in the primary air chamber, said supplementary air chamber means including a casing internally of the primary air chamber and including a check valve portion, said primary air chamber means including a relief port controlled by said check valve portion.

4. In combination in a pneumatic spring construction, means providing a primary spring air chamber, means providing a supplementary spring air chamber, said supplementary spring air chamber communicating with the primary spring air chamber and under predetermined compression loads charging air into the primary spring air chamber, said supplementary spring air chamber having recharging communication with atmosphere, said primary spring air chamber having pressure relief vent to atmosphere, said supplementary air chamber means including a portion serving as a check valve for said relief vent, said supplementary air chamber means being disposed cooperatively externally of the primary air chamber, said primary air chamber having a spring biased check valve for said relief vent.

5. In combination in a pneumatic spring unit, compression members to be secured to respectively the sprung and unsprung portions of a mechanical organization with which the spring unit is to be used, a flexible casing defining a primary pneumatic chamber secured at its opposite ends to the respective compression members and being normally effective by pneumatic internal pressure to maintain said compression members in spaced relation under sprung load, a supplementary pneumatic air chamber casing carried by one of said compression members and operative under compression between said members to supplement the load carrying function of said primary casing, and means for pneumatically charging the primary casing through said supplementary casing, said supplementary casing being disposed internally of the primary casing.

6. In combination in a pneumatic spring unit, a pair of compression plates, one of said plates having an air inlet opening, the other of said plates having an air exhaust opening, a primary pneumatic spring casing connected between said plates and having communication with said exhaust opening, a supplementary pneumatic spring chamber casing having communication with said inlet opening and with the interior of said primary spring chamber and serving as a check valve for the air vent.

7. In combination in a pneumatic spring unit, a pair of compression plates, one of said plates having an air inlet opening, the other of said plates having an air exhaust opening, a primary pneumatic spring casing connected between said plates and having communication with said exhaust opening, a supplementary pneumatic spring chamber casing having communication with said inlet opening and with the interior of said primary spring chamber and serving as a check valve for the air vent, said secondary air chamber casing having means therein for normally maintaining it in extended air vent closing relation.

8. In combination in a pneumatic spring unit of the character described, compression members, a flexible casing of large capacity, a flexible casing of smaller capacity, said casings being secured to one of said compression members with the smaller casing inside of the larger casing and cooperating to define a primary compression chamber between the walls of the casing and a supplementary compression chamber within the smaller casing, an air vent opening from the larger casing, a spring member disposed within the smaller casing and normally extending the smaller casing into sealing relation to said air vent, a charging opening into said smaller casing chamber having a check valve for permitting free entry of air into the supplementary chamber and checking egress of air, and an opening from the smaller casing into the primary chamber including a check valve permitting displacement of air from within the supplementary chamber into the primary chamber but checking return displacement of air, said casings being jointly compressible between said members and under compression effecting displacement of air from the supplementary chamber through the check valved opening into the primary chamber while at the same time the smaller casing checks egress of air from the primary chamber through said air vent, said larger casing being extensible in rebound to a greater extent than the smaller casing to release the smaller casing from said air vent for egress of air from the primary compression chamber through the air vent.

9. In combination in a pneumatic spring unit, means defining an air chamber for disposition between sprung and unsprung members to be held apart by the spring unit, pneumatic means arranged to be responsive to contraction in the spacing between the sprung and unsprung members and communicating with said chamber for charging air into said chamber when the same is subjected to abnormal load compression between said members, said air chamber having a pressure relief vent, and check valve structure maintaining said vent normally closed but arranged to open said vent when said members move into abnormal spaced relation for releasing the air from said chamber to compensate for the coincident abnormal lightening of the load.

10. In combination in a pneumatic spring unit, relatively contractibly and separably cooperatively related members for attachment to respectively sprung and unsprung portions of a vehicle, a pair of separate flexible casings defining air chambers disposed between said members, one of said chambers having an air supply passage thereinto controlled by a check valve permitting ingress of air and checking egress of air from said one chamber, a passage from said one chamber into the other of said chambers for supplying said other chamber with air and having a check valve permitting air flow from said one chamber into said other chamber but blocking return flow of air, whereby when said flexible casings are placed under compression load air in said one chamber can be displaced into said other chamber, said other chamber having an air release passage therefrom normally blocked against escape of air by check valve means but being opened for air relief when said members move apart a predetermined extent to elongate the casing defining said other chamber.

11. In combination in a pneumatic spring unit, relatively contractibly and separably cooperatively related members for attachment to respectively sprung and unsprung portions of a vehicle, a pair of separate flexible casings defining air chambers disposed between said members, one of said chambers having an air supply passage thereinto controlled by a check valve permitting ingress of air and checking egress of air from said one chamber, a passage from said one chamber into the other of said chambers for supplying said other chamber with air and having a check valve permitting air flow from said one chamber into said other chamber but blocking return flow of air, whereby when said flexible casings are placed under compression load air in said one chamber can be displaced into said other chamber, said other chamber having a relief opening therefrom, and spring-urged check valve means maintaining said relief opening closed under compression conditions within the chambers and to a predetermined extent on rebound to afford a snubber action and being released from said pressure relief opening when said members move apart to a predetermined extent and thereby effect displacement of said spring-urged check valve means from said relief opening.

12. In combination in a pneumatic spring construction, a flexible casing providing a compressible primary air spring chamber of large capacity for supporting a sprung load, a second flexible casing providing a supplementary air chamber of smaller capacity and also arranged to be operative as a sprung load sustaining member cooperatively related to said primary chamber casing for incidental compression when the primary air chamber casing is placed under compression, said supplementary chamber casing having a passage communicating with the interior thereof and with the interior of the primary chamber casing, a check valve permitting flow of air from said supplementary chamber casing to said primary air chamber and being responsive to pressure within the primary air chamber to check return flow from the primary air chamber, said supplementary air chamber having an air inlet thereinto and a check valve against egress of air through said inlet, air being displaced from the supplementary chamber into the primary chamber when the supplementary air chamber casing is placed under air compressing pressure to an extent wherein the pressure within the supplementary chamber becomes greater than the pressure in the primary air chamber.

HAROLD R. KAUFMAN.

REFERENCES CITED

The following references are of record in the file of this patent:

UNITED STATES PATENTS

| Number | Name | Date |
| --- | --- | --- |
| 1,055,734 | Funk | Mar. 11, 1913 |
| 1,189,511 | Vawter | July 4, 1916 |
| 1,414,623 | Church | May 2, 1922 |
| 2,018,312 | Moulton | Oct. 22, 1935 |
| 2,192,355 | Kuhn | Mar. 5, 1940 |
| 2,286,563 | Mussey | June 16, 1942 |
| 2,391,841 | Mendelsohn | Dec. 25, 1945 |

FOREIGN PATENTS

| Number | Country | Date |
| --- | --- | --- |
| 253,787 | Great Britain | June 24, 1926 |
| 27,276 | France | Jan. 29, 1924 |
| | 1st Addition to Patent 531,976 | |